United States Patent [19]

Wagner

[11] Patent Number: 5,021,025

[45] Date of Patent: Jun. 4, 1991

[54] METHOD AND MACHINE FOR MAKING FOOD PATTIES

[76] Inventor: Richard C. Wagner, c/o Hollymatic Corporation, 600 E. Plainfield Rd., Countryside, Ill. 60525

[21] Appl. No.: 404,327
[22] Filed: Sep. 12, 1989
[51] Int. Cl.$^5$ ................................................ A22C 7/00
[52] U.S. Cl. .................................... 452/174; 426/513; 425/566
[58] Field of Search ........................... 17/32; 426/513; 452/174; 425/566

[56] References Cited

U.S. PATENT DOCUMENTS

| | | |
|---|---|---|
| Re. 31,857 | 4/1985 | Holly . |
| 444,052 | 1/1891 | Hottman . |
| 800,452 | 9/1905 | Kohn . |
| 2,386,775 | 8/1940 | Balzarini . |
| 2,794,210 | 6/1957 | Opiekon . |
| 2,836,775 | 6/1958 | Adkins . |
| 2,858,219 | 10/1958 | Benson . |
| 2,869,602 | 11/1959 | Rathjen . |
| 3,009,413 | 11/1961 | Alexander et al. . |
| 3,052,919 | 9/1962 | Rayburn . |
| 3,111,739 | 11/1963 | Horton et al. . |
| 3,137,029 | 6/1964 | DeZolt . |
| 3,163,541 | 12/1964 | Mainhardt et al. . |
| 3,221,672 | 12/1965 | Falco . |
| 3,293,688 | 12/1966 | Holly . |
| 3,296,655 | 1/1967 | Vidjak et al. . |
| 3,574,633 | 4/1971 | Flier . |
| 3,609,806 | 10/1971 | Schippers et al. . |
| 3,725,974 | 4/1973 | Kuhlman . |
| 3,747,160 | 7/1973 | Holly et al. . |
| 3,793,466 | 2/1974 | Kawkins et al. . |
| 3,834,849 | 9/1974 | Supran et al. . |
| 3,851,355 | 12/1974 | Hughes . |
| 3,863,020 | 1/1975 | Robinson . |
| 3,903,315 | 9/1975 | Giles et al. . |
| 3,939,530 | 2/1976 | Holly . |
| 3,940,217 | 2/1976 | McCarthy . |
| 3,947,535 | 3/1976 | Bagg et al. . |
| 3,991,440 | 11/1976 | Hendrickson, Jr. . |
| 4,036,997 | 7/1900 | VerBurg . |
| 4,043,728 | 8/1977 | Holly . |
| 4,068,008 | 1/1978 | Orchard . |
| 4,113,415 | 9/1978 | Holly . |
| 4,118,169 | 10/1978 | Haluska . |
| 4,118,831 | 10/1978 | Holly et al. . |
| 4,138,768 | 2/1978 | Roth . |
| 4,148,598 | 4/1979 | Colosimo et al. . |
| 4,153,974 | 5/1979 | Holly et al. . |
| 4,182,003 | 1/1980 | Lamartino et al. . |
| 4,205,415 | 6/1980 | Orchard . |
| 4,272,864 | 6/1981 | Holly . |
| 4,276,318 | 6/1981 | Orlowski et al. ................ 17/32 |
| 4,293,979 | 10/1981 | Colosimo et al. . |
| 4,317,259 | 3/1982 | Wagner . |
| 4,338,702 | 7/1982 | Holly . |
| 4,343,068 | 8/1982 | Holly . |
| 4,356,595 | 11/1982 | Sandberg et al. . |
| 4,372,008 | 2/1983 | Sandberg . |
| 4,422,372 | 12/1983 | Hoezee . |
| 4,535,505 | 8/1985 | Holly et al. . |
| 4,541,143 | 9/1985 | Holly ................................ 17/32 |
| 4,597,135 | 7/1986 | Holly et al. . |
| 4,608,731 | 9/1986 | Holly ................................ 17/32 |

FOREIGN PATENT DOCUMENTS

| | | |
|---|---|---|
| 115244 | 6/1942 | Australia . |
| 1299087 | of 0000 | France . |
| 7501763 | of 0000 | France . |
| 939124 | 10/1963 | United Kingdom . |
| 1146370 | 3/1969 | United Kingdom . |
| 1207623 | 10/1970 | United Kingdom . |
| 1454216 | 2/1974 | United Kingdom . |

*Primary Examiner*—Willis Little
*Attorney, Agent, or Firm*—Wood, Phillips, Mason, Recktenwald & Vansanten

[57] ABSTRACT

A meat patty molding machine having a base plate with an opening therethrough and a fill plate rotatably mounted in the base plate opening. A meat feeder forces meat up through openings in the fill plate. A mold plate defines a disk-shaped mold cavity and is mounted to move laterally between a fill position with its disk-shaped mold cavity in communication with the fill plate and a patty discharge position with the disk-shaped mold cavity away from the fill plate. A drive means rotates the fill plate relative to the mold plate, and the fill plate rotated relative to a stationary cutting blade positioned to cut meat fibers at the upstream surface of the fill plate during filling. By forming the patty while rotating the fill plate relative to the remainder of the mold, a meat patty is formed having longitudinal strands of meat disposed in a substantially circular pattern around the patty axis.

27 Claims, 3 Drawing Sheets

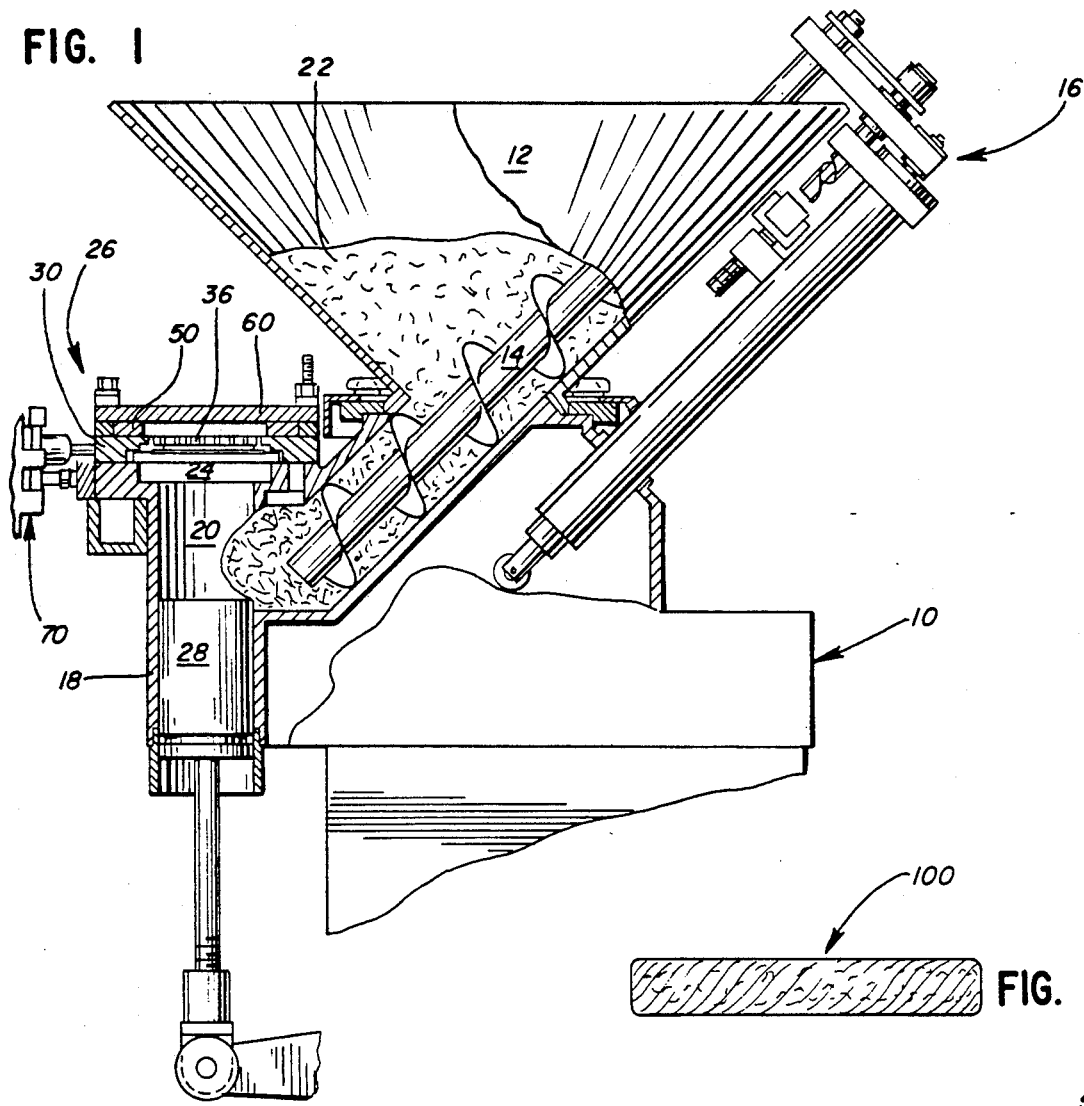
FIG. 1
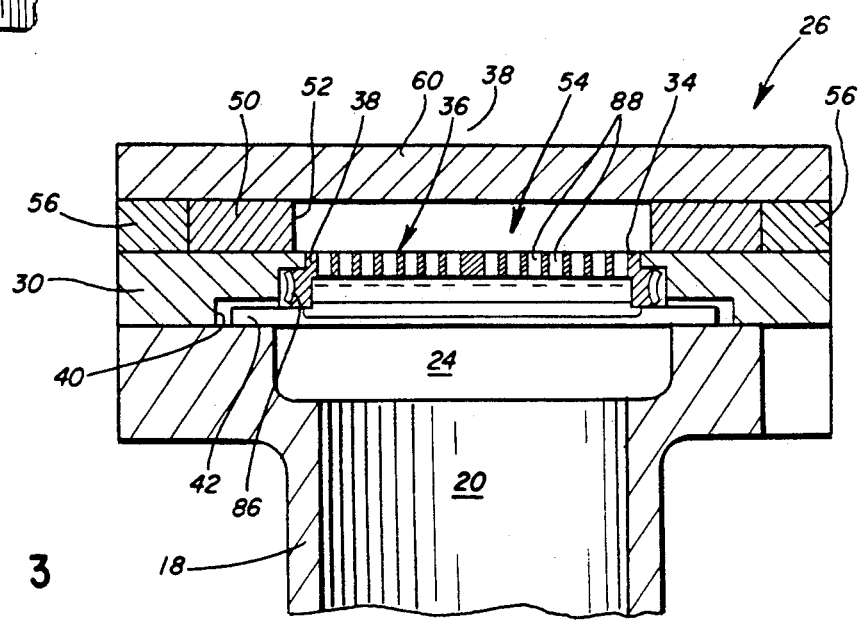
FIG. 2
FIG. 3

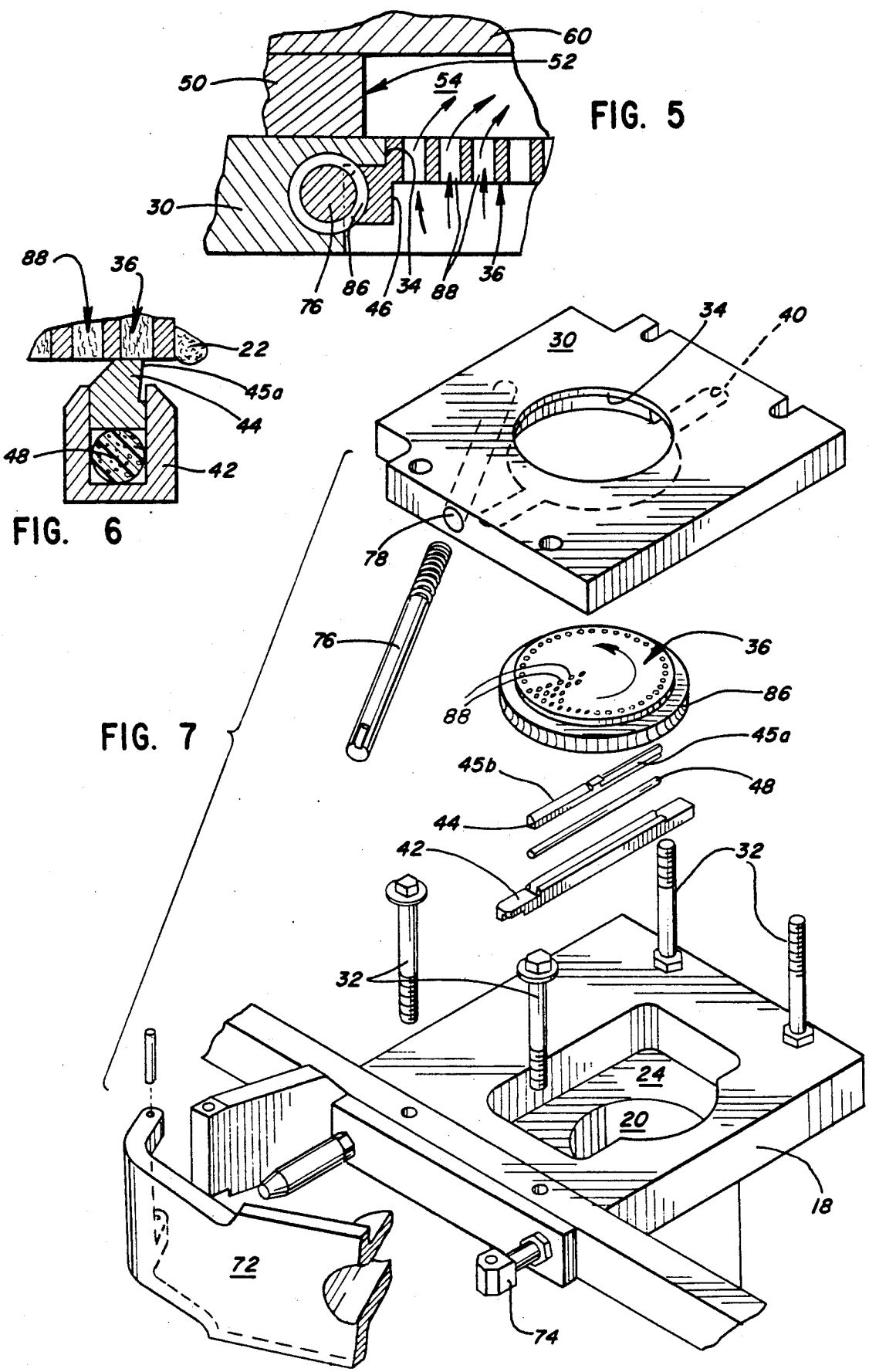

METHOD AND MACHINE FOR MAKING FOOD PATTIES

DESCRIPTION

1. Technical Field

The present invention relates to a machine for making a food patty, and particularly making a hamburger patty of ground meat.

2. Background of the Invention

It is generally known in the art to have a patty molding machine, having a hopper for holding a supply of ground meat such as ground beef, which is progressively advanced to a fill position for delivery of the ground meat into one or more mold cavities in a reciprocal mold plate. Pressure is exerted on the ground meat to fill the mold cavities. After the mold cavities are filled, the mold plate is moved to a knock-out or discharge position where the patties can be forced out of the mold cavities for further handling.

A variety of such molding machines are well known in the art, as shown in, for example, U.S. Pat. Nos. 2,456,778, 3,378,608, 4,272,864, 4,597,134, and 4,768,941. Such machines have formed the meat patties in a variety of ways, and yet have encountered problems with overworking the meat, high pressure required to form the patty, drawing meat back out of the mold after it has been filled, meat patties which will fall apart and shrink unevenly during cooking, and patties which are tough in texture after cooking.

The present invention is directed toward overcoming one or more of the problems set forth above.

SUMMARY OF THE INVENTION

In one aspect of the present invention, a meat patty molding machine is disclosed having a base plate with an opening therethrough, with a fill plate rotatably mounted in the base plate opening. A meat feeder is disposed beneath the base plate and forces meat through openings in the fill plate. A mold plate defines a mold cavity and is mounted to move laterally relative to the base plate between a fill position with its mold cavity over the fill plate and a patty discharge position with the mold cavity away from the fill plate. A drive means rotates the fill plate relative to the mold plate.

In another aspect of the present invention, the fill plate rotates relative to a knife to cut fibers from the bottom surface of the fill plate during filling.

In yet another aspect of the present invention, a method of molding a meat patty is disclosed, including feeding meat into a disk-shaped mold cavity through holes in a fill plate defining one end of the mold cavity, and rotating the fill plate relative to the remainder of the mold while feeding the meat through the fill plate holes. The feed side of the fill plate is cleared by a knife substantially perpendicular to the patty axis by rotating the fill plate relative to the knife.

In still another aspect of the present invention, a meat patty is disclosed having longitudinal strands of meat disposed in a substantially circular pattern around the patty axis.

It is an object of the present invention to provide meat patties which will maintain their shape and not fall apart when handled and/or cooked.

It is another object of the present invention to mold meat patties without overworking the meat.

Still another object of one aspect of the present invention is to provide meat patties which will cook up and shrink uniformly about the central axis of the patty to maintain a circular shape and remain flat even after cooking.

BRIEF DESCRIPTION OF THE DRAWINGS

FIG. 1 is a partial cross-sectional view of one type of patty making machine embodying the present invention;

FIG. 2 is a side view of a food patty formed by the present invention;

FIG. 3 is an side cross-sectional view of the patty-making mold of the present invention;

FIG. 5 is an enlarged fragmentary cross-sectional view taken along line 5—5 in FIG. 4;

FIG. 6 is an enlarged fragmentary cross-sectional view taken along line 6—6 of FIG. 4; and FIG. 7 is an exploded view of a the rotatable fill plate and associated parts.

DESCRIPTION OF THE PREFERRED EMBODIMENT

Figure 4:
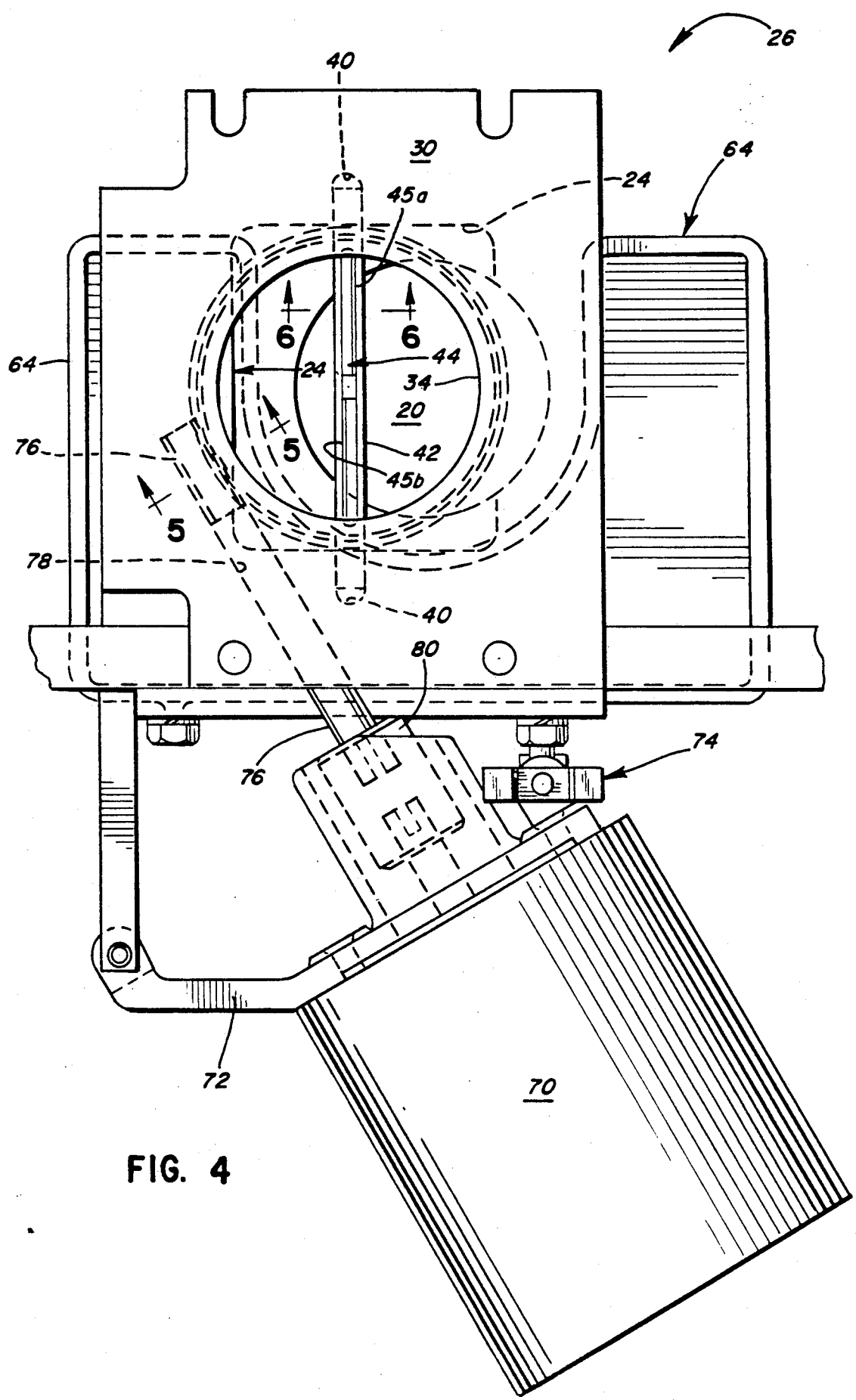
FIG. 4 is a plan view of the patty-making mold of the present invention with the fill plate and other structure above the base plate omitted.

The patty molding machine is shown generally in FIG. 1 and may be generally of the same construction as the machine shown in U.S. Pat. Nos. 4,597,134 and 4,768,941, the disclosures of which are hereby incorporated by reference.

The patty molding machine has a base 10 supporting a hopper 12 thereon in which large quantities of the product to be formed into patties, such as ground beef, may be placed. While reference herein is made to ground beef in the formation of hamburger patties, it will be evident that the disclosed invention applies equally to formation of patties from any food product containing material that tends to cook to a misshapen form.

The hopper 12 is preferably in the shape of an inverted cone and has an auger 14 therein extending substantially along the inner wall of the hopper 12 and rotated by a suitable drive mechanism 16. The ram housing 18 defines a chamber 20 into which the ground meat 22 can be fed by the auger 14.

As shown in the Figures, the chamber 20 further includes a rectangular portion 24 at its upper end, which portion 24 is disposed directly below the molding station 26 as described below. It will be appreciated by those skilled in the art, however, that a variety of configurations of the chamber 20 would be suitable so long as the chamber 20 allows meat to be fed to the molding station 26.

A piston 28 is suitably driven to force the meat 22 up the chamber 20 and into the molding station 26 for formation into patties as further described below.

It will be appreciated by those skilled in the art that the present invention, which relates specifically to the below described molding station 26, could be used with a variety of feed mechanisms other than that shown in FIG. 1.

The molding station 26, as clearly shown in FIG. 3, includes a base plate 30 suitably secured to the ram housing 18, as by the bolts 32 shown (see particularly FIGS. 1 and 7). The base plate 30 includes a cylindrical opening 34 (see FIG. 7) within which is received a disk-shaped or cylindrical fill plate 36 which may rotate about its central axis 38 with respect to the base plate 30 as will be described.

The base plate 30 further includes aligned radial slots 40 which receive a blade holder 42 which secures a cutting blade or knife 44 (see FIGS. 6 and 7) against rotation with the fill plate 36 as described in greater detail further below. The knife 44 includes oppositely facing cutting edges 45a and 45b (see especially FIGS. 6 and 7) on opposite sides of the blade center (which coincides with the fill plate axis 38), which provide improved operation as will be described.

The fill plate 36 includes a cylindrical recess 46 within which the knife 44 is received, and a suitable spring, such as the urethane O-ring spring 48 shown in FIGS. 6 and 7, biases the knife 44 up into the fill plate recess 46 and against the bottom of the fill plate 36.

Disposed on top of the base plate 30 is a mold plate 50 having a cylindrical opening 52 defining a cylindrical or disk-shaped mold cavity 54. The mold plate 50 is shown as having a single mold cavity 54. However, it is within the scope of the invention to have a plurality of transversely aligned mold cavities in the mold plate whereby a plurality of patties can be formed at the molding station 26. Further, while disk-shaped cavities provide the preferred shape of molded patty, it should also be understood that the present invention could also be used with different shaped mold cavities, such as square or oval.

Spacer plates 56 are fixed to the top of the base plate 30 on opposite sides of the mold plate 50 so as to define a channel within which the mold plate 50 may slide in operation. That is, as hereafter described, the mold plate 50 can be moved laterally between a fill position over the fill plate 36 (as shown in FIG. 3) and a knock-out or discharge position spaced from the fill plate 36. Spacer plates 56 having different thicknesses (heights) may be used according to the desired thickness of the molded meat patty (and thus the thickness of the mold plate 50), as will become apparent.

A top or header plate 60 (see FIG. 3) is secured to the tops of the spacer plates 56 and over the mold plate 50 to define the top of the mold cavity 54 (as well as defining the top of the channel allowing lateral movement of the mold plate 50.

A meat collector 64 (see FIG. 4) may also be provided beneath the molding station 26. This collector 64 is essentially a trough which catches meat 22 which may leak out from between the plates of the molding station 26.

A drive motor 70 is suitably mounted to the molding station 26, as by the pivotable bracket 72 shown in FIGS. 4 and 7. A suitable locking mechanism, such as the quick disconnect pin mechanism 74 shown in FIG. 4, is provided to secure the motor 70 in position during operation, while also allowing the motor 70 to be pivoted clear of the molding station 26 during servicing or the like.

The motor 70 drives a worm 76 which extends into a bore 78 in the base plate 30. A suitable coupling 80 is provided between the worm 76 and the motor 70 to transmit the drive forces to the worm 76 while also allowing the motor 70 to be pivoted clear of the molding station 26 as previously described.

It will be understood by those skilled in the art, however, that the drive mechanism shown in the drawings is merely one which would be suitable for rotating the fill plate 36, and any number of other such mechanisms could also be used advantageously.

Referring now specifically to the fill plate 36, a worm gear 86 is provided around its outer periphery, which gear 86 engages the worm 76 (see FIG. 5) so that the fill plate is rotated about its axis 38 during operation.

The fill plate 36 further has a plurality of fill openings 88 to allow passage therethrough of meat 22 from the chamber rectangular portion 24 to the mold cavity 54 as further described hereafter. The fill openings 88 are preferably round and vertical (that is, at right angles to the upper and bottom surfaces of the fill plate 36). Such openings 88 allow for a large fill area over the fill plate 36 (more fill area than allowed with the traditional straight slots fill openings of the prior art). This large fill area, as well as the vertical orientation of the openings 88 (requiring a minimum feed distance through the plate 36), allow meat 22 to be fed into the mold cavity 54 by using low pressures, thereby minimizing both power requirements and reworking of the meat 22. Of course, still other shapes and orientations of the openings 88 could be used advantageously within the scope of the present invention.

It should be appreciated by those skilled in the art that different fill plates, having different size and spaced openings, can be interchanged with the present invention depending on the type of meat 22 being molded.

It should also be appreciated by those skilled in the art that the above patty molding machine can be easily operated. Further, the above machine can be easily cleaned with removal of a minimal number of parts, a significant factor for machines such as this requiring frequent cleaning. To further enhance the easy cleaning capabilities of this invention, the worm 76 is preferably oriented so that it essentially is self threading on the worm gear 86 when it is inserted into the bore 78 during reassembly after cleaning.

Operation of the above described patty molding machine is as follows.

The auger 14 is suitably driven to force meat 22 from the hopper 12 into the feed chamber 20. The piston 28 reciprocates up and down so that, on its up stroke, it forces meat into the chamber portion 24 directly beneath the fill plate 36. The pressure from the piston 28 causes the meat 22 to be forced up against the bottom of the fill plate 36, and to thereby force its way through the fill openings 88 in the fill plate 36 (as shown particularly in FIG. 5).

As the meat 22 is forced through the fill plate openings 88, the fill plate 36 is also being rotated about its axis 38 by the drive motor 70 through the interaction of the worm 76 and the fill plate worm gear 86.

It has been found that rotating the fill plate 36 at a rate of 45 revolutions per minute with fill times of less than a second (and approximately 90 degree rotation of the fill plate 36 during fill) can be suitable for some meats. Increasing the speed of rotation of the fill plate 36 will cause tighter patties to be made, whereas decreasing the rotation speed will result in looser molded patties.

Further, as the fill plate 36 rotates, the stationary knife 44 cuts the meat fibers extending from the bottom (or upstream side) of the fill plate 36. This prevents clogging of the openings 88 by cutting entangled meat fibers between the openings 88, and further prevents meat 22 from being drawn back out of the mold cavity 54 by cutting meat strands at the bottom of the fill plate 36. Also, inasmuch as the knife 44 is essentially stationary relative to the meat 22 (that is, though the meat 22 goes past the blade 44, the blade 44 does not move through the meat 22 laterally to the feed direction), undesirable reworking of the meat 22 which is molded into the patties is minimized.

Still further, the blade 44 is stable during operation due to its oppositely facing cutting edges 45a and 45b on opposite sides of the axis 38. That is, not only are lateral forces on the blade 44 minimized due to its essentially stationary position relative to the meat 22, but the tendency of each cutting edge 45a or 45b of the blade 44 to tip backwards is counteracted by the generally equal but opposite force encountered by the oppositely facing edge 45b or 45a.

When the mold cavity 54 is filled with meat 22, a patty is formed with the meat 22 laid in an essentially circular/spiral pattern. The mold plate 50 is then moved laterally between the spacer plates 56, so that the mold plate cylindrical opening 52 is spaced from the molding station 26 and in a discharge position. During such movement, the patty is carried with the mold plate 50 while sliding over the base plate 30 and under the header plate 60. This sliding motion further helps to keep the patty in its shape by entangling meat fibers on the top and bottom of the patty, effectively binding the patty together.

The patty is then ejected from the mold plate 50 by suitable means, and the patty is used or packaged as desired. The mold plate 50 is then retracted to position its cylindrical opening 52 back over the fill plate 36 for formation of another patty.

Meat patties 100 formed such as disclosed above (and such as shown in FIG. 2) are stable and secure against breaking apart during handling and/or cooking. Also, meat patties 100 having a circular/spiral pattern to their meat strands are formed symmetrically about their center, with substantially uniform density of the meat 22.

Further, meat patties 100 having such a configuration result in an ideal "cook out", with the patties shrinking uniformly about their center. Further, where the patties 100 are circular, as is the most frequent and desirable shape, such uniform shrinking ensures that the patties 100 maintain their desired circular shape even after cooking.

It will be appreciated that, where the fill plate 36 rotates only about 90 degrees during formation of a patty 100, the knife 44 shown in the figures will not fully cut the meat fibers extending from the bottom of the fill plate 36. The cutting action which is accomplished by such operation has nevertheless been found to be sufficient to provide the advantages of this invention as described above. However, should a full cutting action be desired, it will be appreciated by those skilled in the art that the rotation of the fill plate 36 during formation of the patty 100 can be increased to 180 degrees or, alternatively, a knife having an X-configuration (with 90 degrees between legs) could also be provided within the scope of the present invention.

Other aspects, objects, and advantages of the present invention can be obtained from a study of the specification, drawings and appended claims.

I claim:

1. A meat patty molding machine comprising:
    a fill plate having a substantially flat surface thereon and having openings therethrough, said fill plate being rotatably mounted to a base plate and substantially circular with a gear surface therearound;
    means for defining a disk shaped mold cavity on said fill plate;
    means for feeding meat through said fill plate openings into the defined mold cavity; and
    a gear drive engaging said fill plate gear surface for rotating one of said fill plate or said mold cavity defining means relative to the other during feeding of said meat.

2. The meat patty molding machine of claim 1, further comprising means for removably mounting said fill plate with respect to said base plate, whereby a plurality of fill plates may be substituted with different openings adapted to suit the particular meat being molded.

3. The meat patty molding machine of claim 1, wherein said gear drive is a worm gear.

4. The meat patty molding machine of claim 3, wherein said worm gear extends into an opening through said base plate, said worm gear being driven by a motor mounted to said base plate.

5. A meat patty molding machine comprising:
    a fill plate having a substantially flat surface thereon and having openings therethrough;
    means for defining a disk shaped mold cavity on said fill plate;
    means for feeding meat through said fill plate openings into the defined mold cavity;
    means for rotating one of said fill plate or said mold cavity defining means relative to the other during feeding of said meat; and
    a cutting blade mounted to cut meat on the side opposite the fill plate flat surface during feeding of said meat.

6. The meat patty molding machine of claim 5, wherein:
    said fill plate is mounted to a base plate and rotates with respect to said base plate during feeding of said meat; and
    said cutting blade is fixed against rotation relative to said base plate.

7. The meat patty molding machine of claim 5, further comprising means for biasing said cutting blade against the fill plate.

8. The meat patty molding machine of claim 7, wherein said biasing means comprises an O-ring spring.

9. The meat patty molding machine of claim 5, wherein:
    said disk shaped mold cavity is centered about an axis perpendicular to said fill plate; and
    the fill plate and the mold cavity defining means rotate at least 45 degrees about said axis relative to one another during the feeding of said meat to form a single patty.

10. The meat patty molding machine of claim 5 wherein said disk shaped mold cavity is centered about an axis perpendicular to said fill plate, whereby the relative rotation of said fill plate and said mold cavity defining means occurs substantially about said axis; and
    said cutting blade is mounted perpendicular to said axis.

11. A meat patty molding machine, comprising:
    means for feeding meat;
    a base plate disposed over said mat feeding means and having an opening therethrough;
    a fill plate having openings between its top and bottom surfaces allowing meat to pass therethrough, said fill plate being rotatably mounted in said base plate opening;
    a mold plate defining a disk shaped mold cavity, said mold plate being mounted to move laterally between a fill position with its disk shaped mold cavity over said fill plate and a patty discharge position with its disk shaped mold cavity away from said fill plate, and said disk shaped mold cavity being substantially cylindrical about an axis perpendicular to said fill plate when said mold plate is in its fill position; and means for rotating said fill plate and said mold plate relative to one another when said mold plate is in its fill position;

whereby the relative rotation of said fill plate and said mold plate occurs substantially about said axis.

12. The meat patty molding machine of claim 11, wherein said fill plate top surface defines the bottom surface of the defined mold cavity and said feeding means comprises a piston disposed beneath the base and fill plates.

13. A meat patty molding machine, comprising:
means for feeding meat;
a base plate disposed over said meat feeding means and having an opening therethrough;
a fill plate having openings between its top and bottom surfaces allowing meat to pass therethrough, said fill plate being rotatably mounted in said base plate opening and being substantially circular with a gear surface therearound;
a mold plate defining a disk shaped mold cavity, said mold plate being mounted to move laterally between a fill position with its disk shaped mold cavity over said fill plate and a patty discharge position with its disk shaped mold cavity away from said fill plate; and
a gear drive engaging said fill plate gear surface for rotating said fill plate and said mold plate relative to one another when said mold plate is in its fill position.

14. The meat patty molding machine of claim 13, further comprising means for removably mounting said fill plate with respect to said base plate, whereby a plurality of fill plates may be substituted with different openings adapted to suit the particular meat being molded.

15. The meat patty molding machine of claim 13, wherein said gear drive is a worm gear.

16. The meat patty molding machine of claim 15, wherein said worm gear extends into second opening through said base plate, said worm gear being driven by a motor mounted to said base plate.

17. A meat patty molding machine, comprising:
means for feeding meat;
a base plate disposed over said meat feeding means and having an opening therethrough;
a fill plate having openings between its top and bottom surfaces allowing meat to pass therethrough, said fill plate being rotatably mounted in said base plate opening;
a mold plate defining a disk shaped mold cavity, said mold plate being mounted to move laterally between a fill position with its disk shaped mold cavity over said fill plate and a patty discharge position with its disk shaped mold cavity away from said fill plate;
means for rotating said fill plate and said mold plate relative to one another when said mold plate is in its fill position; and
a cutting blade mounted to cut at the bottom surface of the fill plate during feeding of said meat.

18. The meat patty molding machine of claim 17, wherein:

said fill plate rotates with respect to said base plate during feeding of said meat; and
said cutting blade is fixed against rotation relative to said base plate.

19. The meat patty molding machine of claim 17, further comprising means for biasing said cutting blade against the fill plate.

20. The meat patty molding machine of claim 19, wherein said biasing means comprises an O-ring spring.

21. The meat patty molding machine of claim 17, wherein:
said disk shaped mold cavity is centered about an axis perpendicular to said fill plate; and
the fill plate and the mold plate rotate at least 45 degrees about said axis relative to one another when said mold plate is in its fill position to form a single patty.

22. The meat patty molding machine of claim 17:
wherein the relative rotation of said fill plate and said mold plate occurs substantially about an axis perpendicular to said fill plate and centrally located relative to said mold cavity when said mold plate is in its fill position; and
said cutting blade is mounted perpendicular to said axis.

23. A meat patty molding machine, comprising:
a base plate having an opening therethrough;
means for feeding meat from the bottom of the base plate;
a fill plate disposed in the base plate opening, said fill plate being substantially cylindrically shaped with top and bottom flat surfaces on opposite ends of a circular outer surface, said fill plate further having substantially vertical openings between the top and bottom flat surfaces allowing passage therethrough of meat from the feeding means;
a mold plate reciprocable between fill and discharge positions, said mold plate defining a disk-shaped mold cavity over the top flat surface of the fill plate when said mold plate is in its fill position, said mold cavity further having a central axis substantially perpendicular to said fill plate;
a substantially longitudinal cutting blade fixedly positioned relative to the base plate to intersect said axis at substantially right angles when said mold plate is in its fill position; and
drive means for rotating the fill plate about the axis relative to the base plate when the mold plate is in the fill position.

24. A method of molding a meat patty, comprising the steps of;
feeding meat into a disk shaped mold cavity through holes in a fill plate defining one surface of the mold cavity, said disk shaped mold cavity being substantially cylindrical about an axis; and
rotating said fill plate relative to the remainder of the mold cavity about said axis while feeding the meat through the fill plate holes.

25. The method of claim 24, wherein said relative rotation occurs through an angle of at least 45 degrees during feeding.

26. The method of claim 24, wherein the remainder of the mold cavity remains substantially stationary during the feeding step and the fill plate is rotated.

27. The method of claim 26, further comprising the step of cutting meat at the feed side of the fill plate with a blade substantially perpendicular to said axis, said cutting being accomplished by rotation of the fill plate relative to the blade.

* * * * *